TELEPHONE REPERTORY DIALER

Filed Dec. 28, 1964 2 Sheets-Sheet 1

INVENTORS J. L. FISCHER
L. A. STROMMEN

BY E J Olinder

ATTORNEY

United States Patent Office 3,387,099 Patented June 4, 1968

3,387,099
TELEPHONE REPERTORY DIALER

James L. Fischer, Carmel, and Lawrence A. Strommen, Indianapolis, Ind., assignors to Bell Telephone Laboratories, Incorporated, New York, N.Y., a corporation of New York Filed Dec. 28, 1964, Ser. No. 421,457
12 Claims. (Cl. 179—90)

ABSTRACT OF THE DISCLOSURE

In a repertory dialer telephone set multifrequency signals generated conventionally in the CALL mode of operation are translated into binary language to energize $n$-out-of-4 oscillators. The combined output from the oscillators is recorded as a single multifrequency burst—the presence or absence of relevant frequencies being indicative in binary terms of the dialed number.

This invention relates to telephone repertory dialers and more particularly to repertory dialers of the Touch-Tone ® or multifrequency signaling type.

Repertory dialers are automatic telephone call transmitters which enable subscribers to initiate calls by exercising only a minimum of mechanical manipulation, for example, depressing a signal key, as opposed to dialing manually each digit of the called party's directory number. Basically, such apparatus comprises a register which initially stores signal indicia of a group of directory numbers and subsequently, when a call is to be placed, selectively applies these indicia, or related signal indicia, to a telephone line for transmission to a central office.

When dealing with conventional D-C signals such as those generated by the well known rotary type telephone dial, the pulses so generated are typically stored directly in the register or recording medium, which may be a magnetic drum or magnetic tape, for example. In the CALL mode of operation, means are known for extracting the recorded signals, amplifying these signals and applying them directly to a telephone line. One example of a repertory dialer of this type is disclosed in Patent 2,953,-647, issued to A. E. Johanson, Sept. 20, 1960.

With the advent of electronic central office switching systems which are adapted to receive multifrequency dial signals, a need has been created for a repertory dialer that stores and transmits multifrequency dial signals. In the prior art some attempts have been made to develop repertory dialers wherein the conventional pushbutton dial-generated, two-tone signals are recorded directly in the storage media. In such dialers these recorded tones are sensed on command and applied directly to the telephone line. One example of such an arrangement is disclosed in Patent 3,128,351, issued on Apr. 7, 1964, to L. A. Hohmann, Jr., F. W. Kinsmand an T. P. Nenninger.

In a repertory dialer such as that disclosed by Hohmann et al., wherein dial generated multifrequency signals are recorded and wherein these same signals are extracted and applied to the telephone line, consistent accuracy in extracting and transmitting the precise signal as dialed and recorded tends to fall below the rigorous reliability standard of telephone practice. Even though high precision components are utilized in combination with sophisticated frequency correcting arrangements and equipment for synchronizing recording speed with the read-out speed, a certain amount of distortion still occurs, distortion that can result, under certain conditions, in the transmission of spurious signals. Additionally, even though the refinements indicated could conceivably reduce distortion to an acceptable level, the additional expense involved would unduly reduce the commercial attractiveness of the dialer.

One approach to solving the distortion problem inherent in the recording and subsequent reading-out of multifrequency signals is disclosed by R. A. Miller and C. M. Taris in Patent 3,243,517, issued Mar. 29, 1966. Miller and Taris employ a pushbutton dial and in one mode of operation conventional, dial-generated, two-tone signals may be applied directly to the telephone line without storage. When storage of a directory number is desired, however, the operation of the pushbutton dial results in the generation of a group of D-C signals which correspond, in terms of a binary type code, to the digit dialed. A four-track recording head is employed to apply the D-C signal or signals to a magnetic drum and it is the presence or absence of a signal on each of the four parallel tracks that preserves the identity of the dialed digit. On read-out the four-track head simultaneously senses the presence or absence of the recorded D-C signal indicia on each successive group of four-track parallel recordings. This information is then converted into the conventional two-out-of-seven multifrequency code and is utilized to initiate the generation of conventional dual-tone, multifrequency signals for application to the telephone line.

Although the Miller-Taris approach avoids the distortion that is inherent in the direct recording and reading out of multifrequency signals, the multitrack concept introduces other disadvantages in terms of both cost and complexity. Consequently, there is no known system in the prior art that fully meets the need for a commercially attractive and operationally reliable multifrequency signaling repertory dialer.

Accordingly, one object of the invention is to improve repertory dialers of the multifrequency signaling type.

Another object is to reduce the complexity of repertory dialers of the type employing multifrequency signaling.

A further object is to reduce the cost of such dialers.

Another object is to enhance the reliability of such dialers.

These and other objects are achieved in accordance with the principles of the invention by a telephone repertory dialer that translates the operation of a button on a substantially conventional pushbutton dial into one or more out of an available group of oscillatory signal bursts each having a distinct signal frequency. The signal or signals so generated are then combined into a single multifrequency tone which is recorded in the magnetic storage medium. The presence or absence of each of the frequencies in the group, which may be limited to only four, for example, as contrasted to the seven frequencies typically required for telephone multifrequency signaling, is indicative of the digit dialed in terms of a binary type code. On read-out, the recorded tone is separated into its constituent frequencies. This information is then translated into corresponding D-C signals in terms of the conventional two-out-of-seven multifrequency code, which signals are utilized to initiate the generation and transmission of conventional dual-tone multifrequency signals.

The principles of the invention thus stem in part from a realization that much of the complexity and hence much of the cost of generating and storing multifrequency signals in a repertory dialer may be eliminated by recording dialed digits in the form of the combined presence or absence of a limited number of frequencies in accordance with a binary type code.

One aspect of the invention involves the physical orientation of the recorded matter with respect to the recording medium or magnetic tape and with respect to the recording head. Specifically, the principles of the invention call for recording all of the multifrequency signal bursts along a common line, longitudinally along the tape. Thus, no recorded signal is displaced laterally from any other recorded signal—including signals representing digits in different recorded directory numbers. Consequently, the problem of properly aligning the head with any given recorded signal is substantially reduced when compared to conventional practice inasmuch as there is only one direction of relative motion, i.e., longitudinal, between the tape and the head.

Accordingly, one feature of the invention pertains to an arrangement for effecting a two-out-of-seven to binary code conversion and for recording, in a telephone repertory dialer, by means of a single track transducer, the results of this conversion in terms of a multifrequency signal.

Another feature of the invention relates to the combination, in a telephone repertory dialer, of a conventional two-out-of-seven code multifrequency tone generator and a means for generating a binary encoded multifrequency signal, either or both being responsive selectively to the operation of a pushbutton dialing mechanism.

A further feature of the invention concerns the utilization of four oscillators in a repertory dialer to generate various signal frequency combinations which are indicative of dialed digits in terms of a binary code and the combining of these combinations in a single multifrequency signal for recording.

An additional feature of the invention involves the extraction of a multifrequency binary encoded signal from a storage medium, the translation of that signal into a dual frequency signal representing a digit in terms of a two-out-of-seven code and the application of that dual frequency signal to a telephone line.

The principles of the invention, together with additional objects and features thereof will be fully apprehended from the following detailed description of an illustrative embodiment and from the drawing, in which.

Figure 1A:
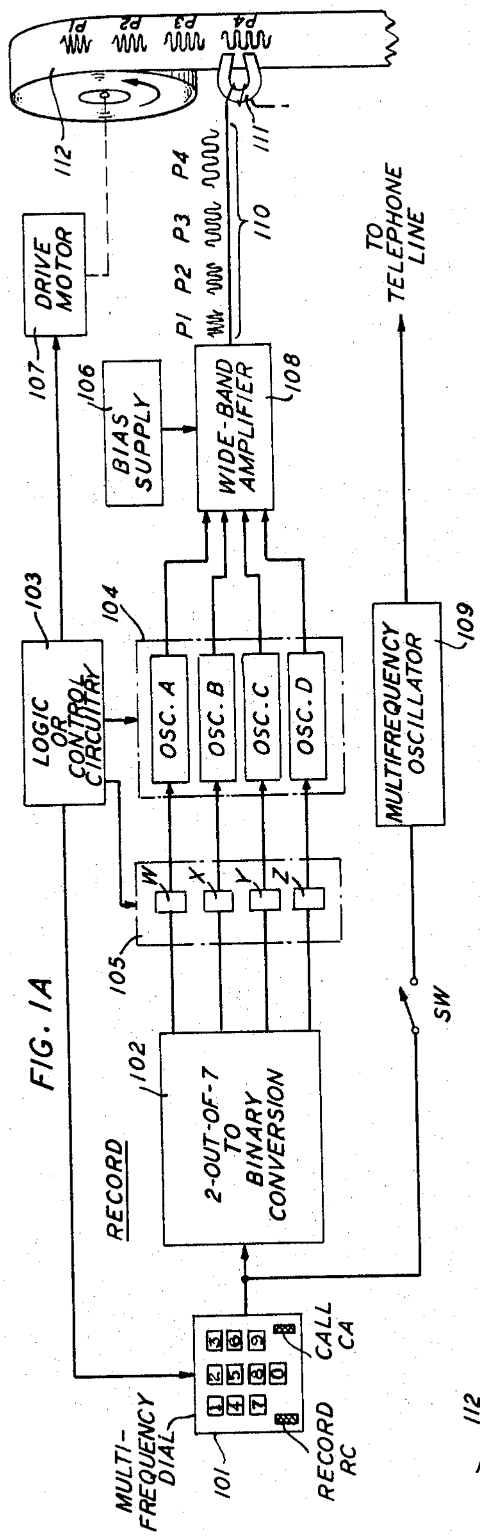
FIG. 1A is a block diagram of a telephone repertory dialer in accordance with the invention illustrating the RECORD mode of operation.

In FIG. 1A, a multifrequency signal generating telephone dial 101 is shown providing an input to a two-out-of-seven to binary conversion circuit 102. The dial 101 is in general conventional and may be substantially of the form currently in commercial use. It includes a group of ten digit-representing buttons, a RECORD button RC and a CALL button CA. The conversion circuit 102 may be of the form shown in the Miller-Taris Patent 3,243,-517 cited above. Outputs from conversion circuit 102 are applied as inputs to the code conversion relays 105 which include relays W, X, Y, and Z. These relays are, in turn, utilized to initiate the operation of corresponding ones of the oscillator group 104 which include oscillators A, B, C, and D, each being designed to produce an oscillatory signal of a unique freqeuncy. Outputs from the oscillator bank 104 are combined and amplified by amplifier 108. The signal group 110 includes signals P1, P2, P3, and P4, each of which, in accordance with the invention, comprises a signal of one or more frequencies generated by oscillators 104. The particular frequency or frequencies included in one of the signals such as signal P1, corresponds to a dialed digit in terms of a suitable binary type code, which is to say that a unique combination of either the presence or absence of each of the four frequencies indicated is utilized to designate each of the ten digits. Signals 110 are applied to magnetic tape 112 by recording head 111.

As shown, tape 112 may be very narrow in width inasmuch as the recording is done sequentially and longitudinally along the tape. Tape 112 is driven by drive motor 107 which, in turn, is under the control of logic or control circuitry 103. Such circuitry may be of the general form shown by Miller and Taris in the patent cited above. Tape 112 is stepped one fixed increment of distance, longitudinally, for the recording of each digit-representing multifrequency signal burst.

In a repertory dialer in accordance with the invention, multifrequency signals may be dialed directly out to a telephone line either with or without the recording of signals. If simultaneous recording and dialing-out is desired, the closing of switch SW places oscillator 109 under control of dial 101 in conventional fashion to effect the transmission of dialed multifrequency signals to a telephone line. If direct dial-out only is desired, without recording, Record button RC is left unoperated and the recording cycle described above does not take place.

Figure 1B:
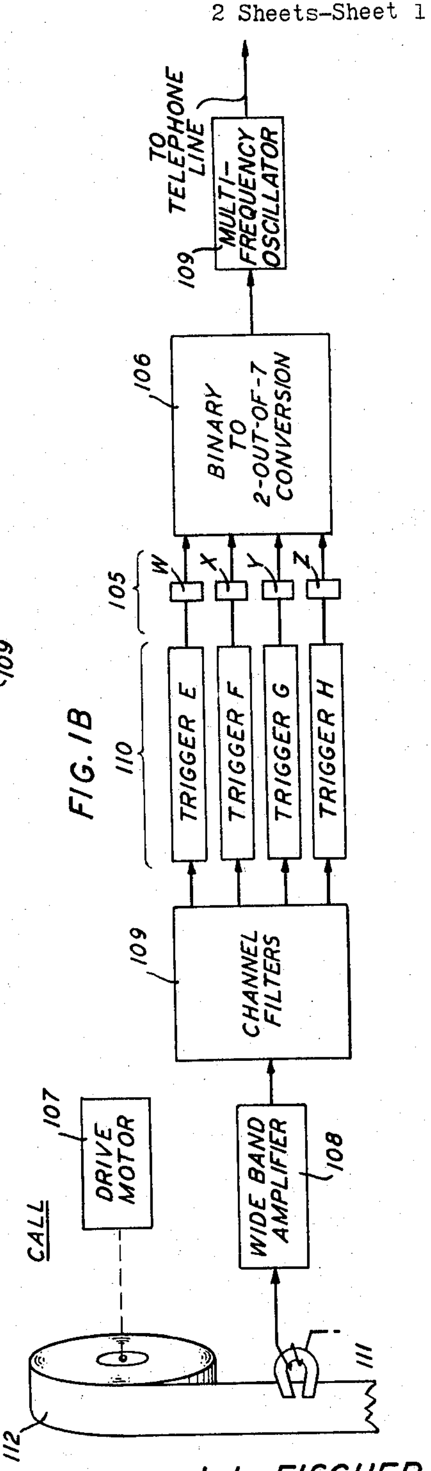
FIG. 1B is a block diagram of a telephone repertory dialer in accordance with the invention illustrating the CALL mode of operation.

In the CALL or automatic dial-out mode of operation illustrated in FIG. 1B, recorded signals on tape 112 are extracted by head or transducer 111 and amplifier by wide band amplifier 108. Each of the signals such as P1 through P4 (each being indicative of a particular digit as explained above), is filtered by the channel filter bank 109 so that each is separated into its constituent frequencies. Each of the constituent frequencies is then applied to a corresponding one of the trigger circuits in the trigger circuit bank 110 which includes individual trigger circuits, E, F. G, and H. The operation of a trigger circuit E, F, G, or H, or other suitable threshhold device, results in the operation of a corresponding one of the code conversion relays 105 which include relays W, X, Y, and Z. With the operation of a particular combination of the relays W, X, Y, and Z, the digit thus represented in binary form is then translated or converted into the conventional two-out-of-seven multifrequency code by conversion circuit 106, which may be of the general form shown by Miller and Taris in the patent cited above. The two-out-of-seven output of circuit 106 is then applied to oscillator 109 which effects the application of a corresponding multi-frequency signal to the telephone line.

At this point, some further discussion of the difference between conventional multifrequency signals in the two-out-of-seven code and multifrequency signals in a binary type code, in accordance with the invention, will contribute to a fuller understanding of the principles of the invention. With binary type multifrequency recording, a total of only four frequencies is employed, whereas in the coventional type of multifrequency recording, a total of at least seven individual frequencies is required. Thus, in a repertory dialer in accordance with the invention, substantially fewer oscillator circuits and filter circuits are employed which reduces both cost and complexity. It should be clear at this point that in the binary type of multifrequency code utilized by the principles of the invention, a single dialed digit is represented by either a single frequency or by some combination of two or more out of a possible four frequencies whereas in the conventional two-out-of-seven code each digit-representing multifrequency signal comprises a unique frequency pair generated in combination. Additionally, inasmuch as the recorded frequencies in a repertory dialer in accordance with the invention are translated internally in the dialer, rather than being applied directly to the subscriber's loop, the center value and degree of distortion of those recorded frequencies is substantially less critical than would be the case if multifrequency signals were recorded directly.

Figure 2:
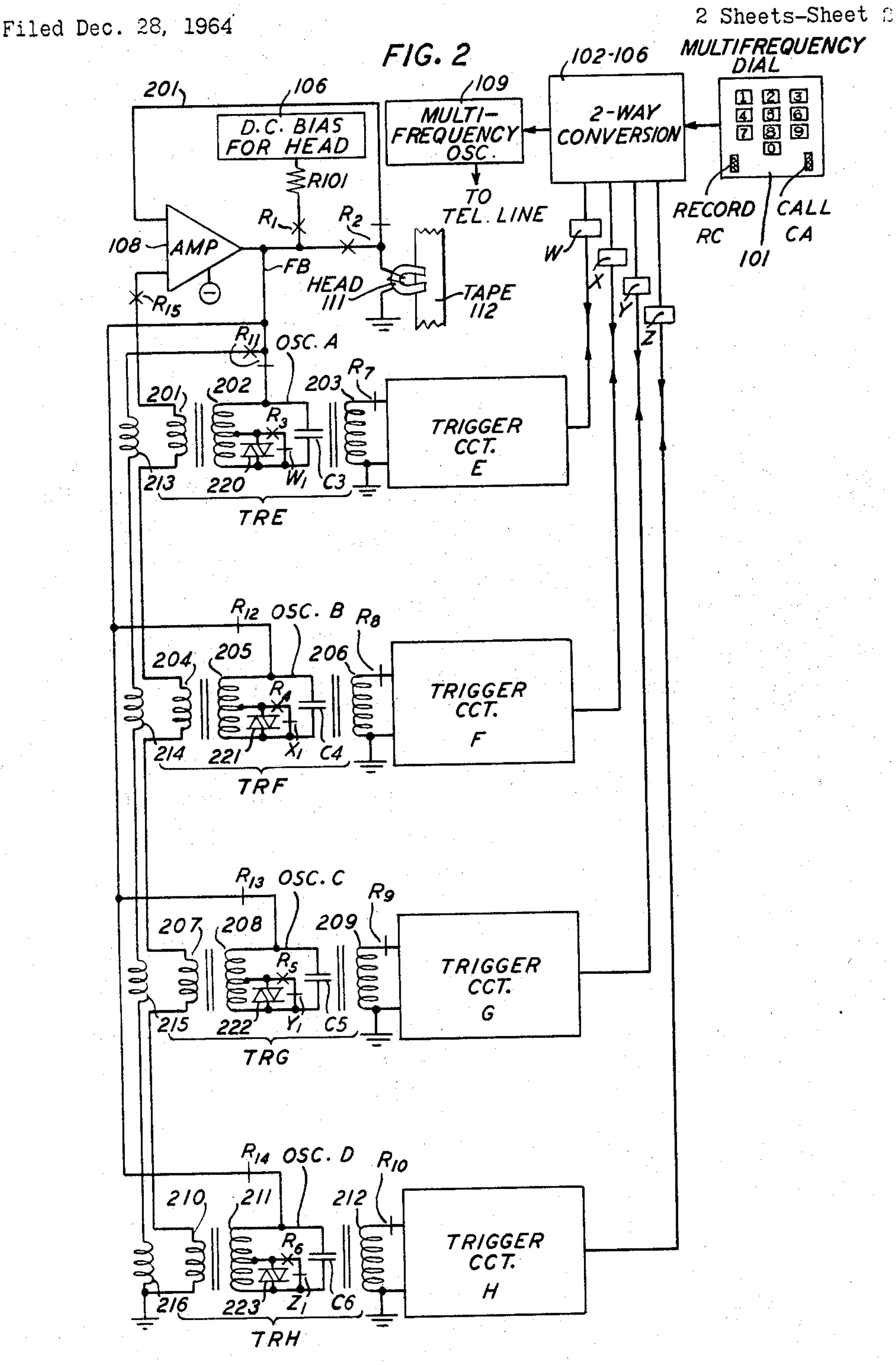
FIG. 2 is a combination schematic circuit diagram and block diagram illustrating in particular certain of the key details of the logic and control circuitry for both the RECORD and CALL modes of operation.

Certain of the key details of the circuitry shown in block form in FIGS. 1A and 1B are shown in schematic circuit form in FIG. 2. These may best be discussed by tracing the operating steps that occur in both the RECORD and CALL modes of operation. In the RECORD mode of operation, the operation of RECORD button RC effects the operation of contacts $R_1$ through $R_{14}$. The operation of one of the digit-representing buttons of dial 101 results in the operation of a corresponding pattern of operations for relays W, X, Y, and Z, and the corresponding operation of contacts $X_1$, $Y_1$, $Z_1$, and $W_1$. As shown, each of the oscillators A through D includes a corresponding one of the coils 202, 205, 208, and 211, and a corresponding one of the capacitors C3, C4, C5, and C6. Each of the coils 202, 205, 208, and 211 has a respective one of the level limiting devices 220, 221, 222, and 223 shunted across a portion thereof to permit multiple oscillations. Level limiting devices 220 through 223 may be varistor pairs, for example, connected to ensure symmetrical conduction.

Each of the oscillator tank circuits A through D has a zero "Q" condition when the circuit is in the RECORD mode. This condition results from the closing of the normally open make contacts $R_3$ through $R_6$, each of which completes a shunt path across a corresponding one of the oscillator coils 202, 205, 208, or 211.

With the designation of a particular frequency to be recorded, which frequency may correspond to the operation of relay X, for example, break contact $X_1$ in oscillator B is operated and the shunt across coil 205 is opened, which permits oscillator B to build up into oscillation and have its frequency added to the frequencies of any of the other oscillators, depending upon whether relays W, Y, or Z were also operated at this time. The frequencies, generated as indicated, are applied by way of a corresponding one or more of the coils 201, 204, 207, and 210 to make contact R to the input of amplifier 108. The output of amplifier 108 is then applied by way of make contact $R_2$ to the recording head 111. It is in this fashion that the combination binary code multifrequency signal is applied to tape 112.

Although the circuits that include coils 202, 205, 208, and 211 have been referred to hereinabove as "oscillators," they are more accurately "tuned" or "tank" circuits. Amplifier 108 in effect serves as a part of an oscillator circuit during the RECORD mode. Feedback to promote sustained oscillations can be provided by any one of a number of means known in the art. One such means, illustrating a feedback loop for signals corresponding to oscillator (or tank circuit) A, is provided by a path that includes make contact $R_{11}$, coil 213, coil 201 and make contact $R_{15}$. Coils 214, 215 and 216 serve the same function as coil 213 in relation to oscillator tank circuits B, C and D, respectively.

In the CALL mode of operation, input to amplifier 108 from head 111 is made by way of path 201 which includes unoperated break contact $R_2$. The output of amplifier 108 is applied to each of the tank circuits of oscillators A, B, C, and D. In the CALL function these tank circuits have their normal "Q" inasmuch as each of the contacts $R_3$ through $R_6$ is unoperated. Accordingly, each of the corresponding frequencies is separated out by the proper tank circuit which in this instance functions as a filter. An additional winding 203, 206, 209, and 212, on each of the oscillator tank circuit coils provides an input to a corresponding one of the trigger circuits E through H. Thus, when a signal of the proper frequency is impressed across one of the tank circuits, it is applied to a corresponding one of the trigger circuits. During the RECORD mode, each of these trigger circuits E through H remains isolated as a result of the operation of break contacts $R_7$ through $R_{10}$. Each of the trigger circuits may be of any suitable conventional trigger circuit form and may, for example, utilize a threshold device such as a silicon controlled switch. The operation of any one of the trigger circuits E through H results in the operation of the corresponding one of the code conversion relays W, X, Y, or Z. This operation is, in turn, converted into an indication in the conventional two-out-of-seven code by the combination conversion circuit 102–106, the output of which is utilized to control oscillator 109. The output of oscillator 109 is then applied to a telephone line.

It is to be understood that the embodiment described herein is merely illustrative of the principles of the invention. Various embodiments may be effected by persons skilled in the art without departing from the spirit and scope of the invention.

What is claimed is:

1. In a telephone repertory dialer, in combination, means for generating binary encoded signal indicia of a directory number, a plurality of oscillatory signal generators selectively responsive to said signal indicia for generating tone bursts, means for combining simultaneous outputs from said signal generators into a single multifrequency signal and means for storing said last named signal.

2. In a telephone repertory dialer, in combination, pushbutton dialing means including a plurality of pushbuttons each corresponding to a respective digit, a plurality of oscillatory signal generating means each adapted to generate a single respective oscillatory signal at a unique single frequency, one or more of said last named means being simultaneously operatively responsive to the operation of each of said pushbuttons in terms of a binary code, means for combining signals simultaneously generated by said generating means into a single oscillatory signal, means for storing said single oscillatory signals, means for extracting stored ones of said single oscillatory signals, and means responsive to said extracting means for translating each of said stored ones of said single oscillatory signals into a corresponding two tone burst in accordance with a preassigned code.

3. Apparatus in accordance with claim 2 wherein said means responsive to said extracting means includes means for translating each of said stored ones of said single oscillatory signals into a simultaneous combination of one or more D-C signals in terms of said digital code and means responsive to each of said combinations of D-C signals for generating a corresponding one of said two tone bursts.

4. Apparatus in accordance with claim 2 wherein said storing means comprise magnetic tape.

5. Apparatus in accordance with claim 2 including means directly responsive to the operation of each of said pushbuttons for generating a two-tone multifrequency signal burst and for applying said burst to a telephone line.

6. In a telephone repertory dialer, in combination, dialing means including an array of pushbuttons each corresponding to a respective digit, a first group of oscillators responsive to the operation of one of said pushbuttons for generating one or more oscillatory signals in accordance with a binary type code, means for combining each of said combinations of signals into a respective single multifrequency signal, means for storing said last named signal, means for extracting said last named signal from said storing means, and means for translating each extracted one of said last named signals into an oscillatory signal including only a basic unique pair of frequencies in accordance with a preassigned code.

7. Apparatus in accordance with claim 6 including means interposed between said array and said oscillator for effecting a conversion from a two-out-of-seven code to a binary type code.

8. Apparatus in accordance with claim 6 including means connecting said group of oscillators in relative parallel configuration.

9. Apparatus in accordance with claim 6 wherein said combining means includes an amplifier.

10. Apparatus in accordance with claim 6 wherein said translating means includes an amplifier, a group of filters for separating said extracted signal into its constituent frequencies, a plurality of relays for effecting a binary to two-out-of-seven conversion, means including a plurality of trigger circuits for energizing said relays, each of said relays being responsive to the application of a signal characterized by one of said constituent frequencies, and means responsive to the operation of one or more of said relays for generating a dual frequency oscillatory signal in accordance with said preassigned code.

11. In a telephone repertory dialer, in combination, dialing means including an array of pushbuttons each corresponding to a respective digit, a group of four oscillators connected in relative parallel circuit configuration, means responsive to the operation of one of said pushbuttons for energizing a corresponding one or a corresponding combination of said oscillators in accordance with a binary type code, means including an amplifier for amplifying and combining simultaneous outputs from said oscillators, means for recording said last named outputs, means for extracting said last named outputs from said recording means, means for amplifying extracted ones of said last named outputs, means for filtering the output of said last named amplifying means thereby to separate said last named output into its constituent signal frequencies, the presence or absence of particular frequencies being indicative of a respective digit in terms of said binary type code, a group of four triggering circuits in parallel configuration each responsive to a respective one of said constituent frequencies for generating a D-C output signal, and means responsive to one or to a parallel simultaneous combination of said last named outputs for generating a dual tone multifrequency signal corresponding to a respective digit and for applying said last named signal to a telephone line.

12. Apparatus in accordance with claim 11 including means directly responsive to the operation of one of said pushbuttons for generating a dual tone multifrequency signal corresponding to a respective digit and for applying said last named signal to a telephone line thereby providing for a simultaneous RECORD and DIAL-OUT mode of operation for said apparatus.

No references cited.

KATHLEEN H. CLAFFY, *Primary Examiner.*

A. H. GESS, *Assistant Examiner.*